(12) United States Patent
Li et al.

(10) Patent No.: US 11,681,602 B2
(45) Date of Patent: Jun. 20, 2023

(54) PERFORMANCE ANALYSIS SYSTEM FOR ANALYZING PROCESSING PERFORMANCE OF PROCESSING DEVICE AND METHOD THEREOF

(71) Applicant: Shanghai Zhaoxin Semiconductor Co., Ltd., Shanghai (CN)

(72) Inventors: Lin Li, Beijing (CN); Xiaoyang Li, Beijing (CN); Zhiqiang Hui, Beijing (CN); Zheng Wang, Beijing (CN); Zongpu Qi, Beijing (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 385 days.

(21) Appl. No.: 16/896,216

(22) Filed: Jun. 9, 2020

(65) Prior Publication Data

US 2021/0056005 A1    Feb. 25, 2021

(30) Foreign Application Priority Data

Aug. 22, 2019   (CN) .......................... 201910777398.2

(51) Int. Cl.
| | |
|---|---|
| G06F 11/34 | (2006.01) |
| G06F 9/48 | (2006.01) |
| G06F 11/30 | (2006.01) |

(52) U.S. Cl.
CPC ............ *G06F 11/3419* (2013.01); *G06F 9/48* (2013.01); *G06F 11/3024* (2013.01);
(Continued)

(58) Field of Classification Search
None
See application file for complete search history.

(56) References Cited

U.S. PATENT DOCUMENTS 8,181,175 B1 *  5/2012  McKee ............... G06F 11/3419
                                                      718/1
8,429,663 B2 *  4/2013  Takagi ................. G06F 9/5027
                                                      718/100
(Continued)

FOREIGN PATENT DOCUMENTS

CN         102447735        5/2012
CN         104881352        9/2015
(Continued)

OTHER PUBLICATIONS

"Office Action of China Counterpart Application", dated Apr. 27, 2021, p. 1-p. 7.

*Primary Examiner* — Abu Zar Ghaffari
(74) *Attorney, Agent, or Firm* — JCIPRNET (57) ABSTRACT

A performance analysis system includes a picker module and a calculation circuit. The picker module is placed in the processing device to capture a plurality of pieces of time information of a unit circuit of each of a plurality of tasks in the processing device during total execution time of processing the plurality of tasks. The calculation circuit performs an interval analysis operation on the time information. The interval analysis operation includes: calculating an overlap period between a current task and a previous task; and counting time occupied by the unit circuit during the total execution time of processing the tasks by the processing device according to a relation between the current time interval of the current task corresponding to the unit circuit and the overlap period.

12 Claims, 7 Drawing Sheets

(52) U.S. Cl.
CPC ...... *G06F 11/3089* (2013.01); *G06F 11/3466* (2013.01); *G06F 2209/508* (2013.01)

(56) References Cited

U.S. PATENT DOCUMENTS

| | | | | |
|---|---|---|---|---|
| 9,317,335 | B2* | 4/2016 | Kose | G06F 15/177 |
| 10,127,626 | B1* | 11/2018 | Ostby | G06T 1/60 |
| 10,552,215 | B1* | 2/2020 | Xu | G06F 9/526 |
| 2006/0179284 | A1* | 8/2006 | Jensen | G06F 9/3851 |
| | | | | 712/E9.032 |
| 2009/0235274 | A1* | 9/2009 | Uruma | G06F 9/4881 |
| | | | | 718/107 |
| 2010/0179979 | A1* | 7/2010 | Kadashevich | G06F 11/3419 |
| | | | | 707/754 |
| 2011/0138397 | A1* | 6/2011 | Kikuchi | G06F 11/3452 |
| | | | | 718/106 |
| 2014/0109069 | A1* | 4/2014 | Lee | G06F 8/45 |
| | | | | 717/149 |
| 2014/0359634 | A1* | 12/2014 | Arao | G06F 11/3003 |
| | | | | 718/104 |
| 2015/0339162 | A1* | 11/2015 | Kose | G06F 13/00 |
| | | | | 718/105 |
| 2017/0017523 | A1* | 1/2017 | Guccione | G06F 9/4881 |
| 2017/0329631 | A1* | 11/2017 | Yin | G06F 9/5011 |
| 2017/0371720 | A1* | 12/2017 | Basu | G06F 9/4881 |
| 2019/0213010 | A1* | 7/2019 | Shin | G06F 9/3836 |
| 2020/0089530 | A1* | 3/2020 | Stankevichus | G06F 9/4881 |
| 2020/0226227 | A1* | 7/2020 | Pelton | G06F 9/3867 |
| 2020/0293330 | A1* | 9/2020 | Mangnall | G06F 9/30014 |
| 2021/0042157 | A1* | 2/2021 | Kim | G06F 1/324 |

FOREIGN PATENT DOCUMENTS

| | | |
|---|---|---|
| CN | 104896651 | 9/2015 |
| CN | 104951367 | 9/2015 |
| CN | 106445772 | 2/2017 |
| CN | 107491252 | 12/2017 |
| CN | 109002377 | 12/2018 |
| CN | 105706022 | 4/2019 |
| CN | 109766188 | 5/2019 |
| WO | 2007048675 | 5/2007 |

\* cited by examiner

PERFORMANCE ANALYSIS SYSTEM FOR ANALYZING PROCESSING PERFORMANCE OF PROCESSING DEVICE AND METHOD THEREOF

CROSS-REFERENCE TO RELATED APPLICATION

This application claims the priority benefit of China application serial no. 201910777398.2, filed on Aug. 22, 2019. The entirety of the above-mentioned patent application is hereby incorporated by reference herein and made a part of this specification.

BACKGROUND OF THE INVENTION

1. Field of the Invention

The present invention generally relates to an evaluation technology for circuit performance, in particular, to a performance analysis system and method.

2. Description of Related Art

With the development of electronic products, requirements for "high performance" and "low power consumption" have become two major design considerations for chip design nowadays. A design engineer needs to model a chip for performance analysis. In general, the performance analysis of the chip needs to be done through a device such as a simulator or an emulator. The design engineer can know from a performance analysis result of the chip that which unit circuit in the chip is a bottleneck that affects the performance, and then optimizes the bottleneck circuit.

Some chips have an "out-of-order execution" function based on design requirements. The so-called "out-of-order execution" means that the chip may perform parallel processing and/or serial processing on a plurality of tasks or requests in a random order (out of order). The result of the "out-of-order execution" is that the tasks subjected to the parallel processing may be overlapped in time. Therefore, the general performance analysis method may not be applied to the chips with the "out-of-order execution".

It should be noted that the partial information (or all) disclosed in this Background section is only for enhancement of understanding of the background of the described technology and therefore it may contain information that does not form the prior art that is already known to a person of ordinary skill in the art. Further, the information disclosed in the Background section does not mean that the information was acknowledged by a person of ordinary skill in the art.

SUMMARY OF THE INVENTION

The present invention provides a performance analysis system and method which can be applied to a processing device for "out-of-order execution".

One embodiment of the present invention provides a performance analysis system configured to analyze processing performance of a processing device. The performance analysis system includes a picker module and a calculation circuit. The picker module is disposed in the processing device and is configured to capture a plurality of pieces of time information of at least one unit circuit of each of a plurality of tasks in the processing device within total execution time that the processing device processes the plurality of tasks. The calculation circuit is configured to perform an interval analysis operation on the plurality of pieces of time information. The interval analysis operation includes the following steps. An overlap period between the current task and the previous task is calculated. The time occupied by the unit circuit in the total execution time that the processing device processes the plurality of tasks is counted according to a relation between a current time interval of the current task corresponding to the unit circuit and the overlap period.

One embodiment of the present invention provides a performance analysis method configured to analyze processing performance of a processing device. The performance analysis method includes the following steps. A plurality of pieces of time information of at least one unit circuit of each of a plurality of tasks in the processing device is captured by at least one picker module disposed in the processing device within total execution time that the processing device processes the plurality of tasks. An interval analysis operation is performed on the plurality of pieces of time information by a calculation circuit. The interval analysis operation includes the following steps. An overlap period between the current task and the previous task is calculated. The time occupied by the unit circuit in the total execution time that the processing device processes the plurality of tasks us counted according to a relation between a current time interval of the current task corresponding to the unit circuit and the overlap period.

Based on the above, the performance analysis system and method of the embodiments of the present invention can calculate the overlap period between the current task and the previous task. The calculation circuit may count the time occupied by the unit circuit in the total execution time that the processing device processes the plurality of tasks including the current task and the precious task according to the relation between the current time interval of the current task and the overlap period. Therefore, the performance analysis system and method can be applied to the processing device for the "out-of-order execution", and can count the effective processing time occupied by each circuit unit in an interval analysis manner and evaluate the performance of the processing device by analyzing a proportion of each effective processing time in the total execution time, so as to provide a reference for further optimization of the performance of the processing device.

In order to make the aforementioned and other objectives and advantages of the present invention comprehensible, embodiments accompanied with figures are described in detail below.

DESCRIPTION OF THE EMBODIMENTS

The term "coupled (or connected)" used in the entire specification (including the claims) may mean any direct or indirect connection means. For example, a first device coupled (connected) to a second device described herein should be interpreted as that the first device may be directly connected to the second device, or that the first device may be indirectly connected to the second device by other devices or by some means of connection. Terms such as "first" and "second" used in the entire specification (including the claims) are used to name components (elements) or to distinguish between different embodiments or ranges, and are not intended to define the upper or lower limit of the number of components or the order of components. Wherever possible, the same reference numbers are used in the drawings and the description to refer to the same or like parts, components or steps. For parts, components or steps denoted by same reference numbers or names, reference can be made to the related descriptions.

Figure 1:
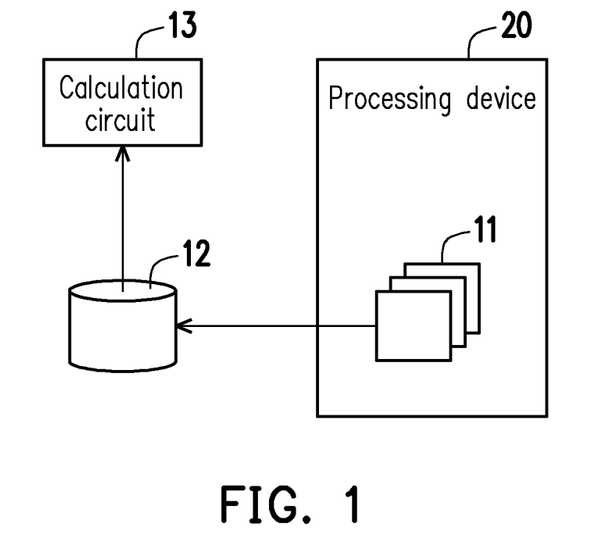
FIG. 1 is a schematic circuit block diagram of a performance analysis system illustrated according to one embodiment of the present invention.

FIG. 1 is a schematic circuit block diagram of a performance analysis system illustrated according to one embodiment of the present invention. The performance analysis system as shown in FIG. 1 includes at least one picker module 11 and a calculation circuit 13. According to design requirements, in some embodiments, the performance analysis system further includes a database 12. The performance analysis system as shown in FIG. 1 may analyze the task processing performance of a target (such as a processing device 20) to be tested. The processing device 20 (or other targets to be tested) may be implemented in the form of hardware, firmware or software (namely program), or in the form of combination of the foregoing three forms according to different design requirements.

In the hardware form, the processing device 20 may be implemented in a logic circuit on an integrated circuit. The processing device 20 may be implemented as hardware by using a hardware description language (HDL) (such as Verilog HDL or VHDL) or other suitable programming languages. For example, the processing device 20 may be implemented in one or more controllers, micro-controllers, microprocessors, Application-Specific Integrated Circuits (ASICs), Digital Signal Processors (DSPs), Field Programmable Gate Arrays (FPGAs) and/or various logic blocks, modules and circuits in other processing units.

In the software form and/or firmware form, the processing device 20 may be implemented as programming codes. For example, the processing device 20 is implemented by using, for example, general programming languages (such as C, C++ or an assembly language) or other suitable programming languages. The programming codes may be recorded/stored in a recording medium, and the recording medium includes, for example, a Read Only Memory (ROM), a storage device, and/or a Random Access Memory (RAM). A computer, a Central Processing Unit (CPU), a controller, a micro-controller or a microprocessor can read and execute the programming codes from the recording medium to realize related functions.

Figure 2:
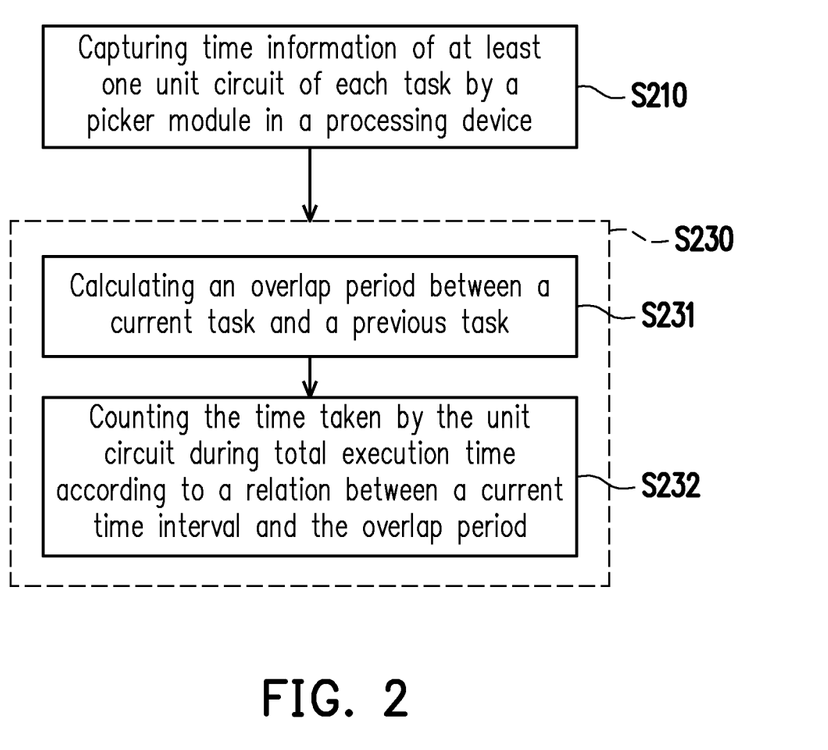
FIG. 2 is a schematic flow chart of a performance analysis method illustrated according to one embodiment of the present invention.

FIG. 2 is a schematic flow chart of a performance analysis method illustrated according to one embodiment of the present invention. Referring to FIGS. 1 and 2, the performance analysis method may analyze the processing performance of the processing device 20. In step S210, a picker module 11 may be arranged inside the processing device 20. The picker module 11 may capture a plurality of pieces of time information of at least one unit circuit of each task (or request) in the processing device 20 within total execution time that the processing device 20 processes a plurality of tasks (or requests).

The content of the time information may be determined according to the design requirements. For example, the time information may include start time and/or end time that the unit circuit processes a certain task. Alternatively, the time information may include stall time (or delay time) when a certain task is temporarily put on hold due to the busyness of the unit circuit. In one embodiment, a plurality of picker modules 11 may be arranged at different nodes of the various unit circuits in the processing device 20, and the plurality of pieces of time information may include time-stamps generated when a certain task is at the plurality of nodes, and/or time intervals calculated according to the plurality of time-stamps. In some embodiments, the plurality of pieces of time information captured by the picker module 11 may be stored in the database 12, but the implementation of the present invention is not limited thereto. In another embodiment, a storage space in the picker module 11 or a storage space in the processing device 20 may also be used to temporarily store the plurality of pieces of captured time information, so that the database 12 may be omitted according to the design requirements.

Next, step S230 is performed. In step S230, the calculation circuit 13 may perform an interval analysis operation on the plurality of pieces of time information to count the time (such as the stall time of delay due to the unit circuit, or the execution time that the unit circuit effectively processes the plurality of tasks) occupied by the unit circuit within the total execution time that the processing device 20 processes the plurality of tasks. The interval analysis operation includes step S231 and step S232. In step S231, the calculation circuit 13 may calculate an overlap period between one current task and one previous task in the plurality of tasks executed within the total execution time.

The processing device 20 may perform parallel processing on the plurality of tasks, that is, the current task and the previous task may be processed in parallel. For example, processing device 20 may be a chip having a plurality of pipeline circuits according to the design requirements. The previous task may be possibly processed by a first pipeline circuit in the plurality of pipeline circuits, and the current task may be possibly processed by a second pipeline circuit in the plurality of pipeline circuits. Therefore, the execution time of the current task may be overlapped with the execution time of the previous task. It should be noted that although the processing device 20 performs out-of-order execution on the plurality of tasks, the plurality of tasks need to be performed in an original order of the plurality of tasks when the plurality of tasks retire from the processing device 20, that is, the retire of the previous task from the processing device 20 may be earlier than that of the current task from the processing device 20. The calculation circuit 13 may calculate the overlap period between the current task and the previous task according to the plurality of pieces of time information in step S231. In one embodiment, the plurality of pieces of acquired time information includes previous retire time that the previous task retires from the processing device 20 and current start time that the current task starts to be processed by the processing device 20, and the overlap period between the previous and latter effective tasks may be calculated by subtracting the current start time from the previous retire time. It is worth noting that in some embodiments, the picker module 11 further determines whether a processing result of one task is effective when the task retires from the processing device 20 (the embodiment of how to determine whether one task is an effective task will be described in detail below in the related description content of FIG. 8). If the processing result of the task is effective, the time information of processing processed by each unit circuit of the task in the processing device 20 is captured, that is, the picker module 11 only captures the time information of the effective tasks in the total execution time in this embodiment.

For a certain unit circuit of the processing device 20, the calculation circuit 13 may also acquire a current time interval (this current time interval corresponds to the unit circuit) of the current task according to the plurality of pieces of time information. For example, the current time interval may be a stall interval (or a delay period) when the current task is temporarily put on hold due to the busyness of the unit circuit. For another example, the current time interval may be an execution interval when the current task is effectively processed by this unit circuit. In the present embodiment, the calculation circuit 13 may count the time occupied by one unit circuit of the processing device 20 within the total execution time that the processing device 20 processes the plurality of tasks (step S232) according to a relation between current time interval of the current task and the overlap period. The aforementioned "occupied time" may be total time of delay due to the unit circuit within the total execution time of performing the plurality of tasks or may also be effective processing time of a specific unit circuit in the total execution time of performing the plurality of tasks, which are used as different performance evaluation results for different analysis purposes.

Figure 3:
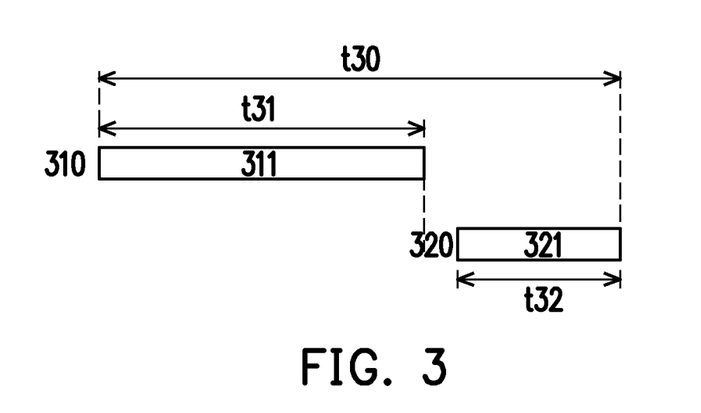
FIG. 3 is a schematic diagram of a delayed task illustrated according to a situation.

FIG. 3 is a schematic diagram of a timeline of two adjacent tasks illustrated according to one situation. The horizontal axis as shown in FIG. 3 represents time. FIG. 3 illustrates two adjacent tasks 310 and 320 processed by the processing device 20. In the embodiment as shown in FIG. 3, an interval 311 is a first period from the time that the task 310 starts to be processed by the processing device 20 to the time that the task 310 retires from the processing device 20, and an interval 321 is a second period from the time that the task 320 starts to be processed by the processing device 20 to the time that the task 320 retires from the processing device 20. The first period 311 of the task 310 has a length of t31, and the second period 321 of the task 320 has a length of t32. According to the acquired information, the calculation circuit 13 may subtract the time that the first task (such as the task 310) starts to be processed by the processing device 20 from the time that the last task (such as the task 320) retires from the processing device 20 to acquire the total execution time t30 that the processing device 20 perform the two tasks. Apparently, in the embodiment of FIG. 3, the total execution time t30 is longer than a length sum of the first period t31 and the second period t32.

Figure 4:
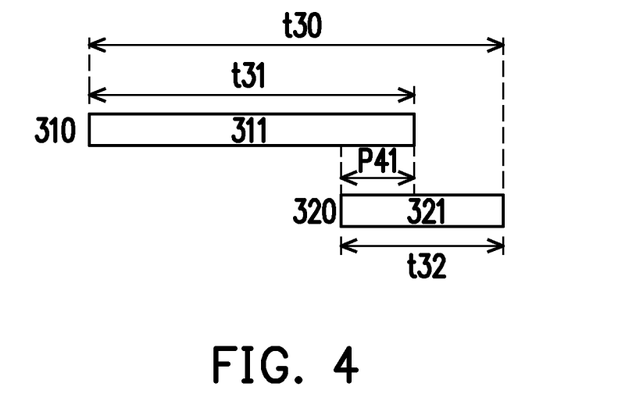
FIG. 4 is a schematic diagram of a delayed task illustrated according to another situation.

FIG. 4 is a schematic diagram of a timeline of two adjacent tasks illustrated according to another situation. The horizontal axis as shown in FIG. 4 represents time. FIG. 4 illustrates two adjacent tasks 310 and 320 processed by the processing device 20. In the situation as shown in FIG. 4, a first period 311 of the task 310 is overlapped with a second period 321 of the task 320, and the overlap period of the first period 311 and the second period 321 is P41. Since a sum of the time lengths t31 and t32 is not equal to the total execution time t30 that the processing device 20 processes the two tasks, according to the acquired information, the calculation circuit 13 may subtract the time that the first task (such as the task 310) starts to be processed by the processing device 20 from the time that the last task (such as the task 320) retires from the processing device 20 to acquire the total execution time t30 that the processing device 20 perform the two tasks. Apparently, in the situation of FIG. 4, the total execution time t30 is shorter than a length sum t31+t32 of the first period 311 and the second period 321.

Referring to FIGS. 2 and 4 now, in step 232, the calculation circuit 13 counts the time occupied by a certain unit circuit in the total execution time t30 that the processing device 20 processes the tasks 310 and 320. Specifically, the calculation circuit 13 accumulates a plurality of current time intervals, corresponding to the unit circuit, of each of the tasks 310 and 320. When the current time interval, corresponding to the unit circuit, of the task 320 is accumulated (at this time, the task 320 may be known as the current task, and the task 310 may be known as the previous task), the current time interval (such as one portion of the second period t32), corresponding to the unit circuit, of the task 320 may be possibly covered by the overlap period P41, and this covered portion has been counted in the accumulation operation of step S232 performed on the previous task 310, so that the accumulation may be only performed after the length covered by the overlap period P41 is removed from the current time interval of the unit circuit in the second period t32 of the task 320. How to perform the counting operation in step S232 in one embodiment will be described in detail below in FIG. 8.

In some embodiments, for the current time interval, the calculation circuit 13 may remove the portion, covered by the overlap period, of the current time interval in step S232 to obtain a removed time interval, corresponding to the unit circuit, of the current task. The calculation circuit 13 may accumulate the removed time intervals of the various tasks within the total execution time to obtain the time occupied by the unit circuit. The "occupied time" may be the total stall time that the plurality of tasks are delayed due to the unit circuit, and at this time, the "current time interval" is a stall time interval that each task is delayed by the unit circuit. The "occupied time" may also be the total execution time that the plurality of tasks are processed by the unit circuit, and at this time, the current time interval is an execution time interval that each task is effectively processed by the unit circuit.

The processing device 20 will be exemplified by an accelerating compression device below. The processing device 20 may compress an original string by a specific compression algorithm to generate a compressed string. However, the present invention is not limited thereto, and other processing devices 20 for parallel out-of-order processing are also applicable to the performance analysis method of the present invention.

Figure 5:
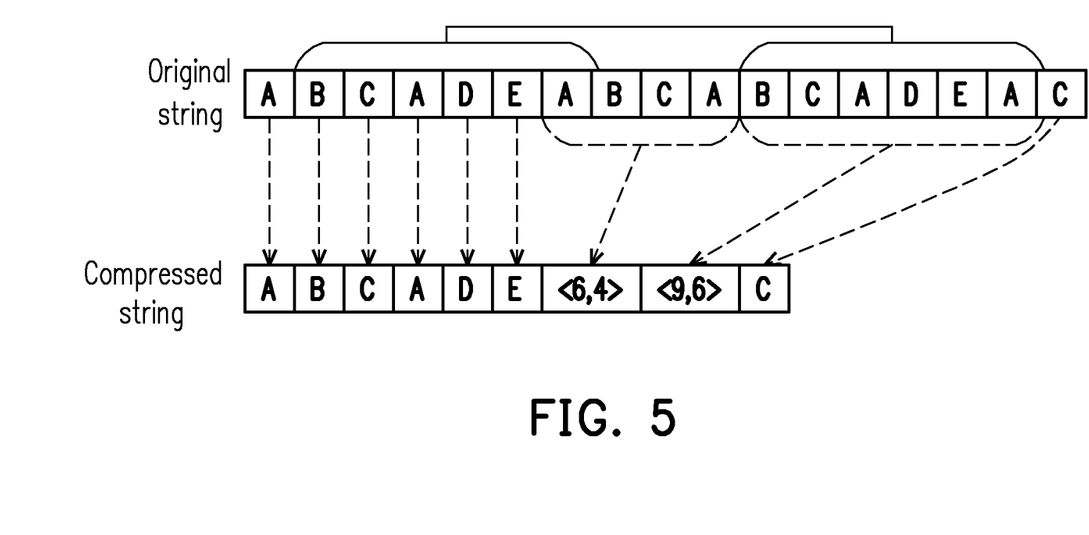
FIG. 5 is a schematic diagram illustrating a situation that the processing device as shown in FIG. 1 compresses an original string to generate a compressed string according to one application example.

FIG. 5 is a schematic diagram illustrating a situation that the processing device 20 as shown in FIG. 1 compresses an original string to generate a compressed string according to one application example. The processing device 20 may divide the original string into a plurality of substrings, and perform dictionary matching on the plurality of substrings. For example, for a first character "A" of the original string, the processing device 20 may take out the substring "ABC"

to match strings in a dictionary (sliding window). There are no words in the current dictionary, and the processing device 20 does not find "ABC" in the dictionary. Therefore, "A" becomes a first character of the compressed string without being compressed, and "A" is also added into the dictionary. For a second character "B" of the original string, the processing device 20 may also take out the substring "BCA" to match strings in the dictionary (sliding window). There is only the string "A" in the current dictionary, and the processing device 20 does not find "BCA" in the dictionary. Therefore, "B" becomes a first character of the compressed string without being compressed, and "B" is also added into the dictionary. By analogy, a third character "C", a fourth character "A", a fifth character "D" and a sixth character "E" are not compressed due to a matching failure of substrings.

For a seventh character "A" of the original string, the processing device 20 takes out the substring "ABC" to match strings in the dictionary (sliding window). There is a string "ABCADE" in the current dictionary, and the processing device 20 finds out "ABC" at a position having a distance (matching offset) of 6 in the dictionary. In addition, the processing device 20 may find in the dictionary that the longest string "ABCA" conforms to the seventh to tenth characters of the original string. Therefore, the seventh to tenth characters "ABCA" of the original string may be compressed to be used as/replace the seventh to tenth characters of the compressed string at the "matching offset of 6 and match length of 4" (namely a matching pair "<6, 4>" as shown in FIG. 5). By analogy, the "BCADEA" of the original string may be compressed to be used as/replace the eleventh to sixteenth characters of the compressed string at "matching offset of 9 and match length of 6" (namely a matching pair "<9, 6>" as shown in FIG. 5).

According to the aforementioned description of FIG. 5, the strings are compassed in a serial mode. In order to increase the parallelism degree of the algorithm, the circuit design of the processing device 20 may adopt a parallel calculation architecture.

Figure 6:
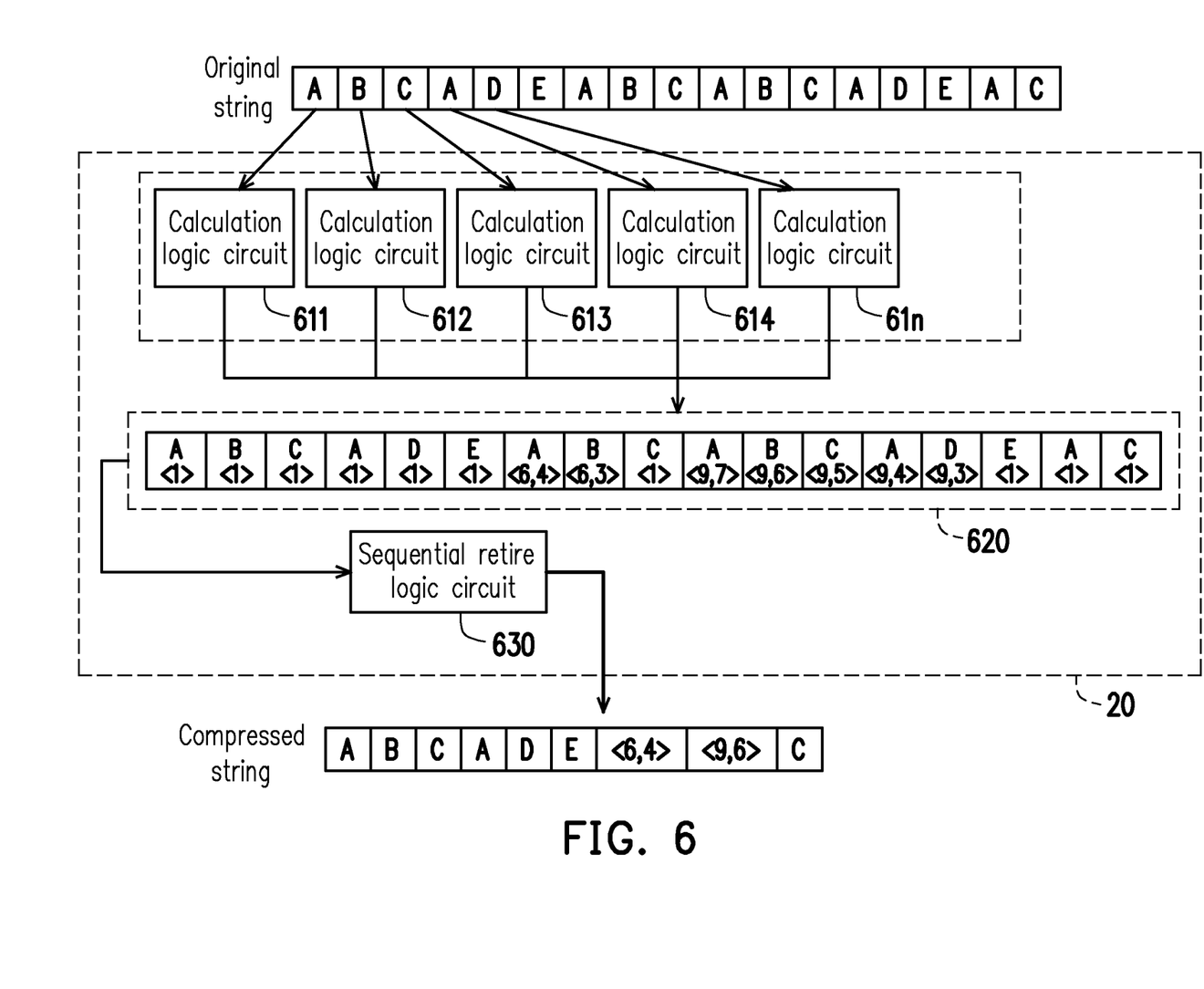
FIG. 6 illustrates a schematic circuit block diagram of the processing device as shown in FIG. 1 according to one application example.

FIG. 6 illustrates a schematic circuit block diagram of the processing device 20 as shown in FIG. 1 according to one application example. In the embodiment as shown in FIG. 6, the processing device 20 includes a plurality of unit circuits, such as n calculation logic circuits 611, 612, 613, 614, . . . , 61n; a result buffer 620; and a sequential retire logic circuit 630. The plurality of substrings of the original string may be issued in parallel to the plurality of calculation logic circuits 611 to 61n. The plurality of calculation logic circuits 611 to 61n may perform dictionary matching to generate matching pairs, and store the matching pairs in the result buffer 620. The sequential retire logic circuit 630 may perform retire processing on the matching pairs of the result buffer 620 according to the order of the original string. For example, when the matching pair of a certain character is "<1>", it is indicated that this character fails in matching, so that this character is added into the compressed string without being compressed. When a certain character has an effective matching pair (for example, when the seventh character "A" has an effective matching pair "<6, 4>"), it is indicated that this character is successfully matched, so that an effectively matched string starting with this character may be compressed.

The processing of the processing device 20 as shown in FIG. 6 is similar to an out-of-order execution function of a contemporary Central Processing Unit (CPU), but there is a little difference. When the CPU performs the retire processing on a plurality of commands, there is no distinction between effective and ineffective commands to be retired. For the compression processing of the processing device 20 as shown in FIG. 6, whether a processing result of a latter substring to be matched is effective is determined by a processing result of the previous substring to be matched, but an ineffective substring still may be processed in various steps by hardware resources of the processing device 20 during the hardware parallel processing, and this ineffective processing may reduce the processing performance of the processing device 20. For hardware similar to the processing device 20 as shown in FIG. 6 to accelerate a serial algorithm by the out-of-order execution, selecting a method to evaluate the execution efficiency of the hardware and intuitively find out a bottleneck implemented on a hardware structure is of great importance for determining whether a compression algorithm may be efficiently implemented.

Figure 7:
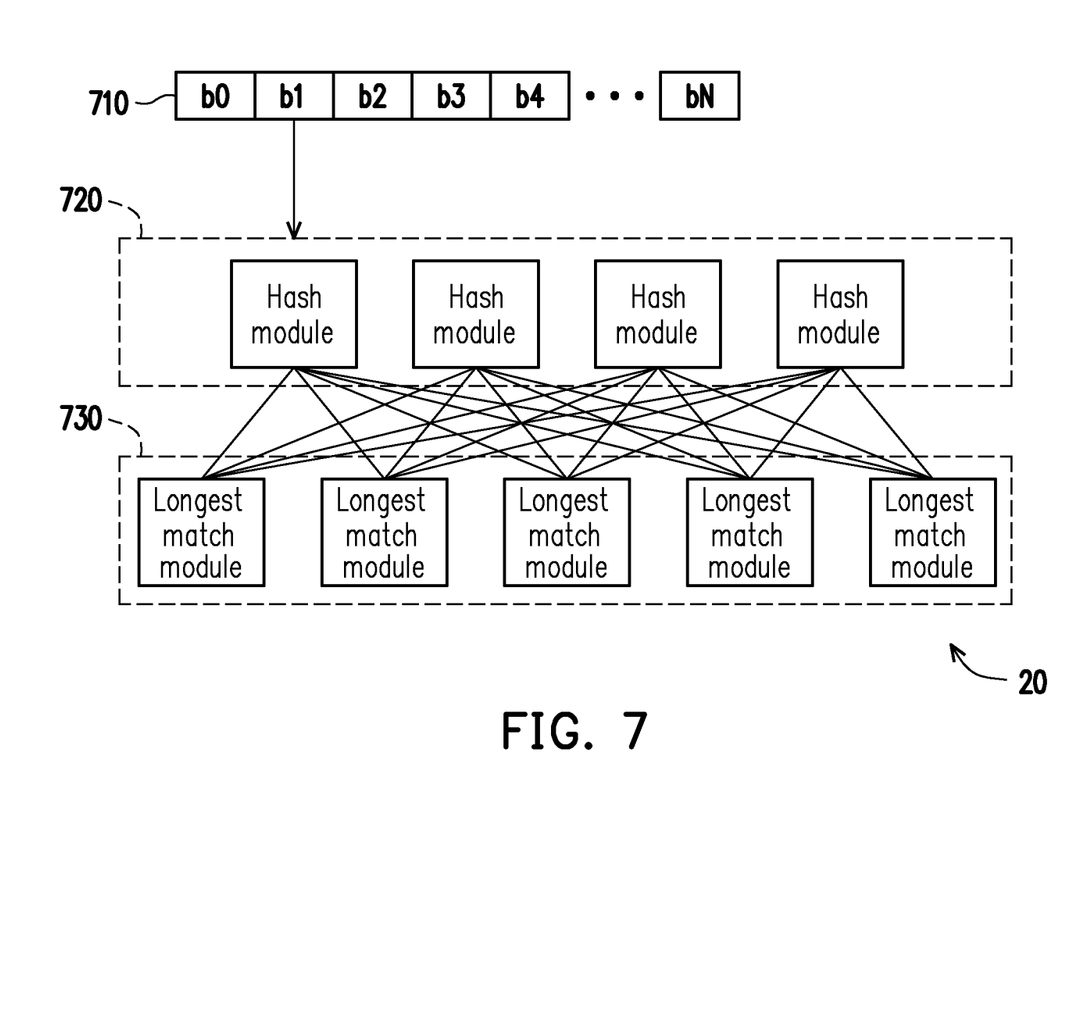
FIG. 7 illustrates a schematic circuit block diagram of the processing device as shown in FIG. 1 according to another application example.

FIG. 7 illustrates a schematic circuit block diagram of the processing device 20 as shown in FIG. 1 according to another application example. The processing device 20 as shown in FIG. 7 includes a plurality of unit circuits, such as an input buffer 710, a hash circuit 720 and a Longest Match (LM) circuit 730. The original string to be compressed that is read from a memory may be stored in the input buffer 710. A plurality of substrings (corresponding to the plurality of tasks in FIGS. 1 and 2) of the original string of the input buffer 710 may be issued to the hash circuit 720 orderly. The input buffer 710 is also used as a temporary buffer for calculation results of the out-of-order execution, and sequentially performs the retire processing in the input buffer 710 as requested. Corresponding encoding results obtained by the retire processing are sent to a subsequent encoder (not shown) for further encoding processing.

The hash circuit 720 as shown in FIG. 7 has a plurality of hash modules. In order to accelerate the searching of positions to be matched, the compression algorithm may use a hash function to implement fast positioning. The plurality of hash modules of the hash circuit 720 as shown in FIG. 7 are used to calculate hash values and provide the positions of the substrings to be matched. The number of hash modules may be determined according to the design requirements. The hash circuit 720 of FIG. 7 uses a 4-path parallel mode to calculate the hash values of different substrings (corresponding to the different tasks in FIGS. 1 and 2). The hash circuit 720 internally has a queue (not shown). If the current calculation of the plurality of hash modules has not been completed, a new request enters the queue of the hash circuit 720. When the queue of the hash circuit 720 is full, the input buffer 710 may not send a new request to the hash circuit 720.

The longest match circuit 730 as shown in FIG. 7 has a plurality of longest match modules. The plurality of longest match modules of the longest match circuit 730 are used to calculate the longest match length. The number of longest match modules may be determined according to the design requirements. For example, the longest match circuit 730 may use a 16-path parallel mode to calculate the longest match length of different substrings (tasks). The match length of each path (each longest match module) that can be compared is 16 bytes, and match lengths more than 16 bytes are transferred to adjacent longest match modules for continuous comparison. The longest match circuit 730 internally has a queue (not shown). If the current calculation of the plurality of longest match modules has not been completed, a new request of the hash circuit 720 enters the queue of the longest match circuit 730. When the queue of the longest match circuit 730 is full, the hash circuit 720 must wait.

It can be found based on the above hardware structure that each substring (task) to be matched performs hash calculation and longest match operations. In the design process, a designer may perform the interval analysis operation of the present embodiment to find out the bottleneck of string compression, and then optimize the bottleneck circuit. If all the parallel hardware modules perform the operations of the effective substrings to be matched, the execution efficiency of the hardware can be greatly improved.

For convenience of explanation, the interval definition is provided here for a time period of the execution of compression of the effective substrings to be matched. The execution time of the effective substrings to be matched in the hash circuit 720 and the longest match circuit 730 is the effective execution time of the hardware, which is defined as "base time". The base time is a sum of the execution time of the hash circuit 720 for one substring to be matched and the execution time of the longest match circuit 730 for the substring to be matched. The effective substring to be matched may be sent to the hash circuit 720, but has not been read into the input memory 710, so that the hardware must wait, and this may spend some time. The delay time that the substring (task) to be matched waits to be read into the input buffer 710 may be defined as a "prefetch-stall interval". The current effective substring to be matched has been read into the input buffer 710, but since the previous substring to be matched has not yet been issued to the hash circuit 720, the current effective substring to be matched must wait. The delay time that the substring (task) to be matched waits to be issued in the input buffer 710 may be defined as an "issue-stall interval". The effective substring to be matched has been issued to the queue of the hash circuit 720, but the hardware of the hash circuit 720 is being used, causing this substring to be matched to wait. The delay time that the substring (task) to be matched waits in the queue of the hash circuit 720 may be defined as a "hash-stall interval". The hash circuit 720 has found all positions to be matched for the effective substring to be matched, but may not send the effective substring to the longest match circuit 730 for processing. Or, the longest match circuit 730 is being used, causing this substring to be matched to wait. The delay time that the substring to be matched (task) waits in the queue of the longest match circuit 730 may be defined as a "longest-match-stall interval". After the longest match circuit 730 completes the calculation of the current substring to be matched, the current substring to be matched needs to wait for the sequential retire logic circuit (not shown in FIG. 7) to perform corresponding encoding processing, but since the previous substring to be matched has not yet completed the corresponding retire calculation (caused by the out-of-order execution), this current substring to be matched needs to wait for the retire. The delay time that the substring to be matched (task) waits for the retire may be defined as a "retire-stall interval".

From the global execution process of the entire hardware flow, since there are a plurality of pipeline circuits (the plurality of hash modules and the plurality of longest match modules) performing the out-of-order execution in parallel, the global execution intervals of a plurality of substrings (tasks) to be matched are likely to be overlapped with each other. For the processing device 20 in the total execution time of one compression task, the contribution of the time within the overlap interval of the effective substrings to be matched to the entire total execution time is repeated, so the repeated portions must be removed in consideration of the distribution of the total execution time in the various time intervals, thereby obtaining effective distributions of various execution intervals within the real total execution time. By observing the distributions of different time intervals, it can be found that the stall interval of which portion (which unit circuit) contributes to the bottleneck of the execution efficiency of the processing device 20. After the position of the bottleneck is acquired, the designer may optimize bottleneck circuit-associated logic and functions, thereby increasing the proportion of the "base time" in the entire total execution time, which naturally improves the execution efficiency of the processing device 20.

Figure 8:
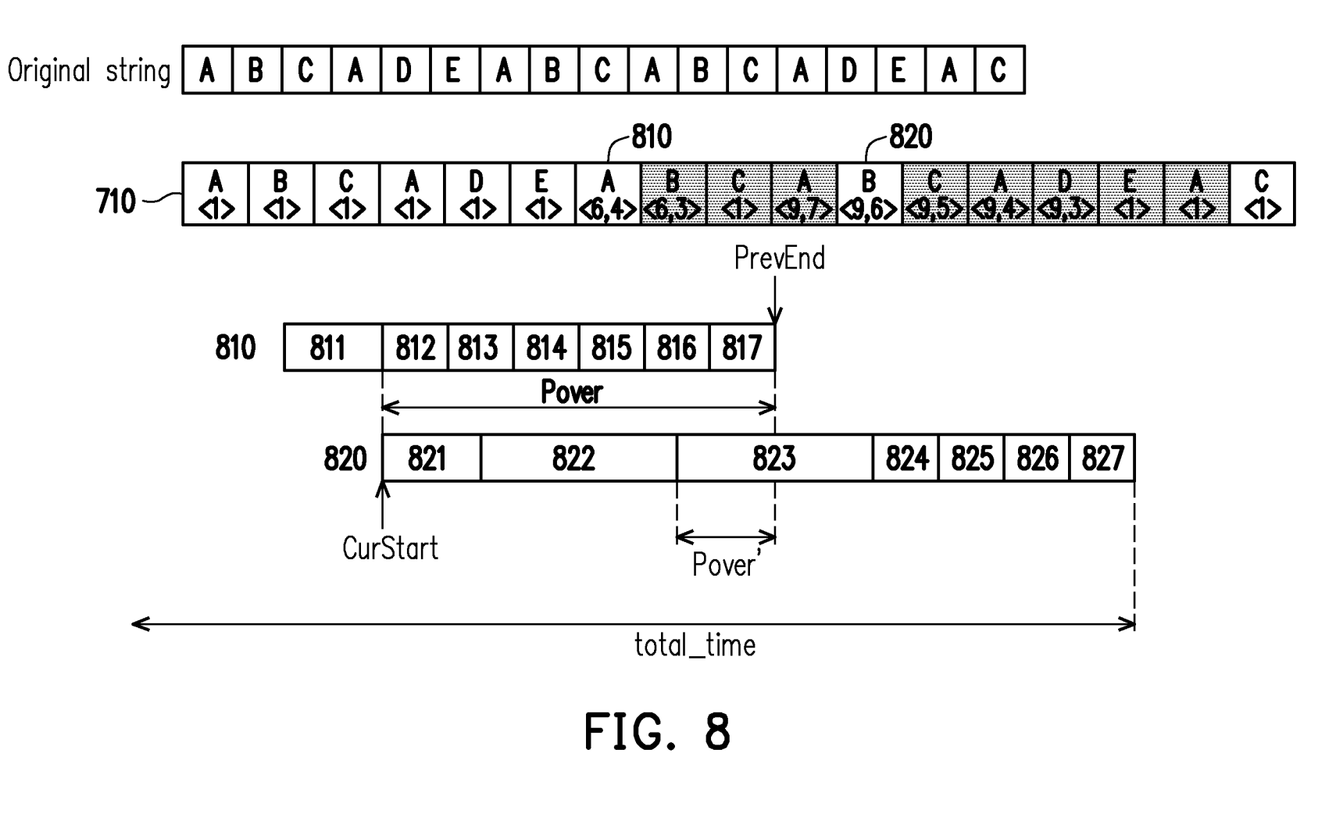
FIG. 8 is a schematic diagram illustrating a time interval that the processing device 20 as shown in FIG. 7 compresses an original string to generate a compressed string according to one application example.

FIG. 8 is a schematic diagram illustrating a time interval that the processing device 20 as shown in FIG. 7 compresses an original string to generate a compressed string according to one application example. The horizontal axis as shown in FIG. 8 represents time. In the situation example as shown in FIG. 8, the compression operation performed on the substring starting with the seventh character "A" of the original string is known as a previous task 810, and the compression operation performed on the substring starting with the eleventh character "B" of the original string is known as a current task 820. During the compression operation of the previous task 810 by the processing device 20, the first period of the previous task 810 includes a prefetch-stall interval 811, an issue-stall interval 812, a hash-stall interval 813, a hash execution interval 814, a longest-match-stall interval 815, a longest-match-execution interval 816, a retire-stall interval 817 and the like. Similarly, during the compression operation of the current task 820 by the processing device 20, the second period of the current task 820 includes a prefetch-stall interval 821, an issue-stall interval 822, a hash-stall interval 823, a hash execution interval 824, a longest-match-stall interval 825, a longest-match-execution interval 826, the retire-stall interval 827 and the like. In the situation example as shown in FIG. 8, a matching result of the substring starting with the seventh character "A" is <6, 4>, that is, the matching length of the matching result is 4, which will cover the seventh to tenth characters, so that the matching results of the substrings starting with the eighth to tenth characters "B", "C" and "A" are all ineffective, and the matching result of the compression operation performed on the substring starting with the eleventh character "B" is effective. Therefore, in one embodiment, the picker module 11 of FIG. 1 may determine whether the matching result of each substring (task) is effective when the substring (task) retires. The aforementioned time information corresponding to this substring (task) is acquired if the matching result is effective.

In the situation example as shown in FIG. 8, there is an overlap period Pover between the current task 820 and the previous task 810. The calculation circuit 13 may acquire, according to the time information captured by the picker module 11, the intervals 811 to 817 and the intervals 821 to 827. In addition, in some embodiments, the calculation circuit 13 may also calculate, according to the captured time information, the overlap period Pover between the current task 820 and the previous task 810. In other embodiments, the calculation circuit 13 may also acquire, according to the captured time information, previous retire time PrevEnd of the previous task 810 and current start time CurStart of the current task 820. The calculation circuit 13 may calculate a difference value between the previous retire time PrevEnd and the current start time CurStart to obtain the overlap period Pover between the current task 820 and the previous task 810.

In some embodiments, when the calculation circuit 13 counts the time occupied by each circuit unit within the total execution time total_time (for example, during the counting of the time occupied by the hash circuit 720, the hash-stall intervals 813 and 823 or the hash execution intervals 814 and 824 need to be accumulated; during the counting of the time occupied by the longest match circuit 730, the longest-match-stall intervals 815 and 825 or the longest-match-execution intervals 816 and 826 need to be accumulated), the portion, covered by the overlap period Pover, of the current time interval may be removed for the current time interval (such as one of the time intervals 821 to 827 of the current task 820) corresponding to the circuit unit, so as to obtain a removed time interval, corresponding to a certain unit circuit, of the current task 820. The calculation circuit 13 may accumulate the removed time intervals of the various tasks to obtain the time (the effective execution time of each task in the unit circuit or the stall time of delay due to the unit circuit) occupied by the unit circuit. For example, the calculation circuit 13 may remove a portion, covered by the overlap period Pover, of the hash-stall interval 823 for the hash-stall interval 823 to obtain a removed time interval, corresponding to the hash circuit 720, of the current task 820. The calculation circuit 13 may accumulate the removed time interval of the current task 820 to an accumulation result of the hash-stall interval 813 of the previous task 810 and the hash-stall intervals of other earlier tasks, so as to obtain the stall time of delay due to the hash circuit 720.

The calculation circuit 13 may compare a relation between the current time interval, corresponding to a certain unit circuit, of the current task 820 and the overlap period Pover. For example, the calculation circuit 13 may compare a relation between the prefetch-stall interval 821 corresponding to the input buffer 710 and the overlap period Pover. When the length of the overlap period Pover is greater than that of the current time interval (such as the prefetch-stall interval 821), the calculation circuit 13 may subtract the length of the current time interval (such as the prefetch-stall interval 821) from the length of the overlap period Pover to obtain a new overlap period Pover', and then set the length of the current time interval as 0 (for example, 0 is used as the length of the removed time interval of the input buffer 710). By analogy, the lengths of the prefetch-stall interval 821 and the issue-stall interval 822 are both set as 0 (removed since these time intervals have been accumulated in the counting step of the previous task 810 or the earlier tasks), and the overlap period Pover is shortened to be the overlap period Pover' as shown in FIG. 8. When the length of the overlap period Pover' is not greater than that of the hash-stall interval 823 (the current time interval), the calculation circuit 13 may subtract the length of the overlap period Pover' from the length of the hash-stall interval 823 to obtain a length of the removed time interval of the hash circuit 720 (the "removed time interval" is not accumulated in the counting step of the previous task 810), and then set the length of the overlap period Pover' as 0.

In other embodiments, the calculation circuit 13 may perform the following pseudocode, so as to perform the interval analysis operation. In the following pseudocode, i and j are variables (integers), and eff_retire represents the number of characters (tasks) to be matched that effectively retire. The number eff_retire is determined according to actually executed tasks. CurStart represents the start time of the current task. PrevEnd represents the retire time of the previous task. Pover represents the overlap period between the current task and the previous task. The start time CurStart, the retire time PrevEnd and the overlap period Pover may be analogized with reference to related descriptions of the start time CurStart, the retire time PrevEnd and the overlap period Pover as shown in FIG. 8; and interval_number represents the number of time intervals that will be occupied in the compression operation performed on one task. By taking the situation as shown in FIG. 8 for example, the number interval_number of intervals may be 7; and interval[i][j] represents the $j^{th}$ time interval of the $i^{th}$ task. By taking the situation as shown in FIG. 8 for example, assume that the $i^{th}$ task is the current task 820 as shown in FIG. 8. When j is 0, the time interval interval[i][j] is the prefetch-stall interval 821 as shown in FIG. 8; and when j is 1, the time interval interval[i][j] is the issue-stall interval 822 as shown in FIG. 8. By analogy, when j is 6, the time interval interval[i][j] is the retire-stall interval 827 as shown in FIG. 8.

```
while(i<eff_retire)
  get CurStart            \\ obtaining the start time of the current task
  get PrevEnd             \\ obtaining the retire time of the previous task
  Pover = PrevEnd−CurStart   \\ calculating the overlap time of adjacent tasks
  for(j <interval_number)
    if(Pover> interval[i][j])
      Pover = Pover− interval[i][j]
      interval[i][j] = 0
    else:
      interval[i][j] = interval[i][j] − Pover
      Pover = 0
    endif
    interval_sum[j] = interval_sum[j] + interval[i][j]
                              \\ accumulating values of different time intervals
    j++                       \\ next time interval
  endfor
  i++                         \\ next task
endwhile
for(j <interval_number)
  ratio[j] = interval_sum[j] / total_time
       \\ calculating the ratio of a sum of different time intervals to the total execution time
  j++                         \\ next time interval
endfor
```

After the counting of the sum value interval_sum[j] of different time intervals is completed, the interval analysis operation may further calculate a ratio (namely ratio [j]) of the time (namely the sum value interval_sum[j]) occupied by a certain unit circuit to the total execution time total_time that the processing device 20 processes the tasks. For example (referring to the situation example as shown in FIG.

8), the calculation circuit 13 may perform the aforementioned pseudocoele to provide a ratio [0] of the prefetch-stall interval, a ratio [1] of the issue-stall interval, a ratio [2] of the hash-stall interval, a ratio [3] of the hash execution interval, a ratio [4] of the longest-match-stall interval, a ratio [5] of the longest-match-execution interval and a ratio [6] of the retire-stall interval to the designer. After acquiring the ratios [j] of the different time intervals, the designer may acquire the position of the bottleneck of the execution efficiency and then optimize the bottleneck circuit-associated logic and functions. Therefore, the proportion of the "base time" in the entire execution time may be increased, and the execution efficiency of the processing device 20 is naturally improved.

The blocks of the calculation circuit 13 may be implemented in the form of hardware, firmware or software (namely program), or in the form of combination of the foregoing three forms according to different design requirements. In the hardware form, the blocks of the calculation circuit 13 may be implemented in a logic circuit on an integrated circuit. The related functions of the calculation circuit 13 may be implemented as hardware by using an HDL (such as Verilog HDL or VHDL) or other suitable programming languages. For example, the related functions of the calculation circuit 13 may be implemented in one or more controllers, micro-controllers, microprocessors, ASICs, DSPs, FPGAs and/or various logic blocks, modules and circuits in other processing units.

In the software form and/or firmware form, the related functions of the calculation circuit 13 may be implemented as programming codes. For example, the calculation circuit 13 is implemented by using, for example, general programming languages (such as C, C++ or an assembly language) or other suitable programming languages. The programming codes may be recorded/stored in a recording medium, and the recording medium includes, for example, an ROM, a storage device, and/or a RAM. A computer, a CPU, a controller, a micro-controller or a microprocessor can read and execute the programming codes from the recording medium to realize the related functions. As the recording medium, a "non-transitory computer readable medium" may be used. For example, a tape, a disk, a card, a semiconductor memory and a programmable logic circuit may be used. Furthermore, the program may also be provided to the computer (or CPU) via any transmission medium (a communication network or radio wave and the like). The communication network is, for example, an Internet, a wired communication medium, a wireless communication medium or other communication mediums.

Based on the above, the performance analysis system and method of the embodiments of the present invention can calculate the overlap period Pover between the current task 820 and the previous task 810. The calculation circuit 13 may count the time occupied by a certain unit circuit in the total execution time total_time that the processing device 20 processes the plurality of tasks according to the relation between the current time interval of the current task 820 and the overlap period Pover. Therefore, the performance analysis system and method can be applied to the processing device for the "out-of-order execution".

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A performance analysis system, configured to analyze processing performance of a processing device, the performance analysis system comprising:
   a processor, configured to execute a picker module disposed in the processing device, wherein the picker module captures time information of each of a plurality of tasks for a unit circuit in the processing device within total execution time that the processing device processes the plurality of tasks; and
   a calculation circuit, configured to perform an interval analysis operation on the time information of the plurality of tasks, wherein the interval analysis operation comprises:
   calculating an overlap period between a second period of a current task among the plurality of tasks and a first period of a previous task among the plurality of tasks, wherein the first period is an interval from time that the previous task starts to be processed by the processing device to time that the previous task retires from the processing device, and the second period is an interval from time that the current task starts to be processed by the processing device to time that the current task retires from the processing device;
   removing a portion, covered by the overlap period, of a current time interval occupied by the unit circuit during the second period of the current task to obtain a removed time interval, occupied by the unit circuit, of the current task;
   accumulating the removed time intervals of the plurality of tasks to obtain time that is occupied by the unit circuit within the total execution time that the processing device processes the plurality of tasks;
   subtracting a length of the current time interval from a length of the overlap period when the length of the overlap period is greater than that of the current time interval and then setting the length of the current time interval as 0, which is the length of the removed time interval;
   subtracting the length of the overlap period from the length of the current time interval when the length of the overlap period is not greater than that of the current time interval to obtain a length of the removed time interval and then setting the length of the overlap period as 0; and
   outputting the time that is occupied by the unit circuit within the total execution time that the processing device processes the plurality of tasks, wherein the time that is occupied by the unit circuit relates to an effectiveness of the unit circuit.

2. The performance analysis system according to claim 1, wherein the processing device has a plurality of pipeline circuits, the previous task is processed by a first pipeline circuit which is one of the plurality of pipeline circuits, the current task is processed by a second pipeline circuit which is another one of the plurality of pipeline circuits, and the previous task retires from the processing device prior to the current task.

3. The performance analysis system according to claim 1, wherein the interval analysis operation further comprises:
   calculating a ratio of the time that is occupied by the unit circuit to the total execution time that the processing device processes the plurality of tasks.

4. The performance analysis system according to claim 1, wherein the time information of the plurality of tasks comprise previous retire time that the previous task retires from the processing device and current start time that the current task starts to be processed by the processing device, wherein the overlap period is calculated and obtained by subtracting the current start time from the previous retire time.

5. The performance analysis system according to claim 1, wherein when one of the plurality of tasks retires from the processing device, the picker module further determines whether a processing result of the task is effective and captures the time information of the task processed by the unit circuit in the processing device if the processing result is effective.

6. The performance analysis system according to claim 1, further comprising:
a database, coupled to the calculation circuit and configured to store the time information of the plurality of tasks captured by the picker module for the calculation circuit to read.

7. A performance analysis method, configured to analyze processing performance of a processing device, the performance analysis method comprising:
capturing, by a picker module disposed in the processing device, time information of each of a plurality of tasks for a unit circuit in the processing device within total execution time that the processing device processes the plurality of tasks; and
performing, by a calculation circuit, an interval analysis operation on the time information of the plurality of tasks, wherein the interval analysis operation comprises:
calculating an overlap period between a second period of a current task among the plurality of tasks and a first period of a previous task among the plurality of tasks, wherein the first period is an interval from time that the previous task starts to be processed by the processing device to time that the previous task retires from the processing device, and the second period is an interval from time that the current task starts to be processed by the processing device to time that the current task retires from the processing device;
removing a portion, covered by the overlap period, of a current time interval occupied by the unit circuit during the second period of the current task to obtain a removed time interval, occupied by the unit circuit, of the current task;
accumulating the removed time intervals of the plurality of tasks to obtain time that is occupied by the unit circuit within the total execution time that the processing device processes the plurality of tasks;
subtracting a length of the current time interval from a length of the overlap period when the length of the overlap period is greater than that of the current time interval and then setting the length of the current time interval as 0, which is a length of the removed time interval;
subtracting the length of the overlap period from the length of the current time interval when the length of the overlap period is not greater than that of the current time interval to obtain a length of the removed time interval and then setting the length of the overlap period as 0; and
outputting the time that is occupied by the unit circuit within the total execution time that the processing device processes the plurality of tasks, wherein the time that is occupied by the unit circuit relates to an effectiveness of the unit circuit.

8. The performance analysis method according to claim 7, wherein the processing device has a plurality of pipeline circuits, the previous task is processed by a first pipeline circuit which is one of the plurality of pipeline circuits, the current task is processed by a second pipeline circuit which is another one of the plurality of pipeline circuits, and the previous task retires from the processing device prior to the current task.

9. The performance analysis method according to claim 7, wherein the interval analysis operation further comprises:
calculating a ratio of the time that is occupied by the unit circuit to the total execution time that the processing device processes the plurality of tasks.

10. The performance analysis method according to claim 7, wherein the time information of the plurality of tasks comprise previous retire time that the previous task retires from the processing device and current start time that the current task starts to be processed by the processing device, and the operation of calculating the overlap period between the current task and the previous task comprises:
calculating the overlap period by subtracting the current start time from the previous retire time.

11. The performance analysis method according to claim 7, further comprising:
when one of the plurality of tasks retires from the processing device, determining, by the picker module, whether a processing result of the task is effective and capturing the time information of the task processed by the unit circuit in the processing device if the processing result is effective.

12. The performance analysis method according to claim 7, further comprising:
storing, by a database, the time information of the plurality of tasks captured by the picker module for the calculation circuit to read.

* * * * *